Figure 1A:
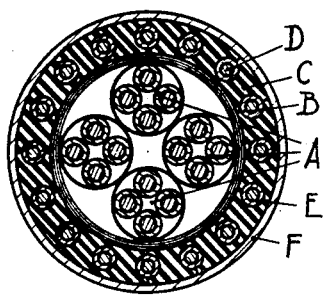

April 1, 1930.  G. ZAPF  1,753,079

SUBMARINE CABLE WITH PRESSURE PROTECTING COVERING

Filed Sept. 12, 1928

G. Zapf INVENTOR

By: Marks & Clerk
Attys.

Patented Apr. 1, 1930

1,753,079

UNITED STATES PATENT OFFICE

GEORG ZAPF, OF RIEHLERWALL, COLOGNE, GERMANY, ASSIGNOR TO FELTEN & GUILLE-AUME CARLSWERK ACTIENGESELLSCHAFT, OF COLOGNE-MULHEIM, GERMANY

SUBMARINE CABLE WITH PRESSURE-PROTECTING COVERING

Application filed September 12, 1928, Serial No. 305,542, and in Germany October 31, 1927.

Various forms of construction of cables for comparatively deep seas have been proposed in which a tubular member constituted by profile wires has been provided as a pressure protecting covering directly over the cable core and so as to support the lead sheathing. These forms of construction, however, have certain disadvantages and the object of the present invention is to provide means by which these disadvantages are overcome.

Whilst, in the pressing of a lead sheathing on a cable core, it is very easy to press the sheathing tightly onto the core so that it adheres firmly thereto, when a protecting covering of profile wires is laid directly on the core of the cable, it may easily occur that the latter lies rather loosely in the protecting covering, more especially in view of the fact that it is not permissible to press the profile wires too tightly, for instance in order to maintain the true capacity values in a telephone cable. It is in the case of cables intended for comparatively deep seas that too small a friction between the conductors of the cable and the pressure protecting covering may have disastrous consequences. It has to be borne in mind that a freely suspended copper wire as used for conductors is extended by its own weight to an extent which is twice as great as the extension of a steel wire of high tensile strength having the same length and that the length of a copper wire that will break under these conditions is of the order of three thousand metres. Therefore, if the core of the cable is not held in position by the pressure protecting covering, there is a possibility that during the laying of the cable at depths of a few thousand metres, the conducting wires will break, or at least that they will become entangled and, as a result thereof, for instance in the case of a telephone cable, the capacity values will be altered.

According to the invention, the breaking of the conducting wire or the entangling thereof in a submarine cable is avoided by this that the friction between the cable core and the pressure protecting covering is artificially increased. This may, for instance, be effected by inserting at certain distances (of about 100 metres) rings of elastic material, for instance india-rubber, the said rings being secured between the cable core and the tube of profile wires which constitute the pressure protecting covering.

Such a construction is especially useful for signalling conductors with air insulation in which the cable core can be tightened to a large extent so that there is sufficient space for the said rings. Preferably the rings are made in the form of cylindrical hollow bodies, the thickness of the wall of which increases conically towards the centre.

Figure 1B:
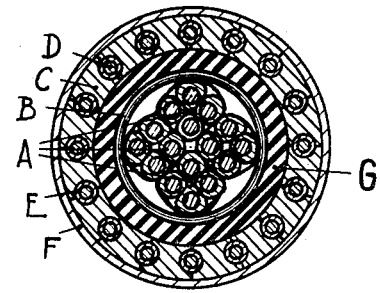

Referring to the accompanying drawings, which illustrate the invention by way of example, Figure 1ª is a cross section of a cable provided with a pressure protecting covering, whilst Figure 1ᵇ illustrates the same cable in which the cable core is pressed by a hollow cylindrical member of elastic material.

Figure 2:
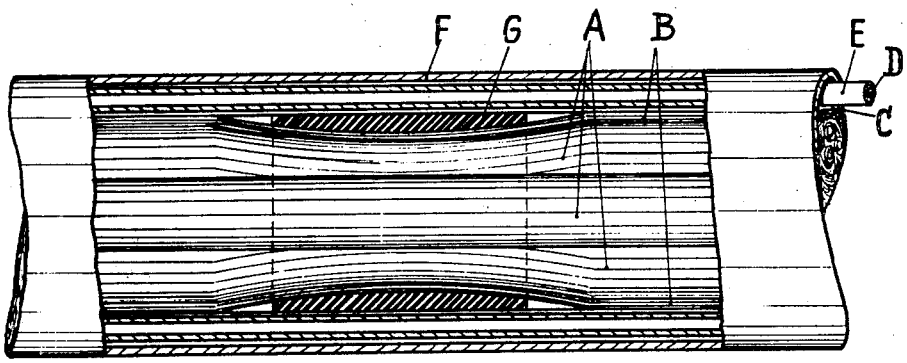

Figure 2 illustrates in sectional elevation a portion of the same cable where such a hollow member is provided.

The same reference letters have been used in all the figures.

The core of the cable is constituted by four quads A, which may be used for telephone or telegraph transmission. The quads are surrounded with a paper strip winding B which gives the core an approximately cylindrical form. The pressure protecting covering consists of aluminium wires C in which the steel wires D, which are surrounded by lead E, are embedded. A gutta-percha layer F is provided over the pressure protecting covering. One or more lead sheathings and the usual armouring are provided around the gutta-percha layer; however, they are not illustrated as they do not form part of the present invention. G is a cylindrical hollow body which may, for instance, be made of rubber and the thickness of which increases conically towards the centre.

What I claim is:

1. A submarine cable having a pressure protecting covering constituted by profile wires or strips forming a tube and means between the core of the cable and the said pressure protecting covering for increasing the friction between them.

2. A submarine cable as claimed in claim 1 and in which the said means for increasing the pressure between the cable core and the pressure protecting covering consists of rings of elastic material firmly inserted between them.

3. A submarine cable as claimed in claim 1 and in which the said means for increasing the pressure between the cable core and the pressure protecting covering consists of rings of india-rubber firmly inserted between them.

In testimony whereof I have signed my name to this specification.

GEORG ZAPF.